United States Patent [19]
King

[11] Patent Number: 5,971,468
[45] Date of Patent: Oct. 26, 1999

[54] INCORPORATION OF VEHICLE DISPLAY INTO VEHICLE SUNVISOR

[75] Inventor: Joseph D. King, Ann Arbor, Mich.

[73] Assignee: UT Automotive Dearborn, Inc., Dearborn, Mich.

[21] Appl. No.: 09/098,084

[22] Filed: Jun. 16, 1998

[51] Int. Cl.[6] .................................................... B60J 3/00
[52] U.S. Cl. ............................................................. 296/97.5
[58] Field of Search ........................................... 296/97.5

[56] References Cited

U.S. PATENT DOCUMENTS

| | | | |
|---|---|---|---|
| D. 294,495 | 3/1988 | Nissley | 296/97.5 |
| 2,547,101 | 4/1951 | Uttz | 296/97.5 |
| 4,875,229 | 10/1989 | Palett et al. | 296/97.5 |
| 5,320,399 | 6/1994 | White et al. | 296/97.5 |

FOREIGN PATENT DOCUMENTS

| | | | |
|---|---|---|---|
| 406144009 | 5/1994 | Japan | 296/97.5 |

OTHER PUBLICATIONS

Advertisement for Audiovox Specialized Applications; *LCD Rear Observation System*.

*Primary Examiner*—Gary C. Hoge
*Attorney, Agent, or Firm*—Howard & Howard

[57] ABSTRACT

A display panel for displaying information to a vehicle operator is placed on a rear surface of a sunvisor for the vehicle. The display panel is hidden when the sunvisor is moved to a stowed position but is easily accessible to the operator when the sunvisor is moved to its extended position. The location of the display panel on the sunvisor allows the operator easy access to the information without diverting information from the road. In addition, control buttons are associated with the display panel such that the operator is able to adjust the information displayed on the panel, or to adjust a component for responding to the information displayed on the panel.

6 Claims, 1 Drawing Sheet

INCORPORATION OF VEHICLE DISPLAY INTO VEHICLE SUNVISOR

BACKGROUND OF THE INVENTION

This invention relates to a combined vehicle sunvisor and display panel.

Vehicles are being supplied with more and more displays to provide information to an operator. As an example, information with regard to the current operating condition of the vehicle, such as speedometer, fuel gauge, oil temperature, etc. have historically been provided to a vehicle operator. More recently, new products such as vehicle navigation systems have provided additional information to the operator. Further, environmental control systems such as temperature, air conditioning, lights, radio and other entertainment information are also provided to the operator.

The increase in the amount of information provided to the operator has resulted in a situation wherein there are many display areas on the instrument panel of the vehicle. Many of these areas are in a location wherein the driver must look away to access the information, such that the driver's attention is not on the road.

Many of the prior art display panels are in a location where the operator must look away from the road in more than one axes. As an example, many display panels are positioned spaced towards the passenger seat from the driver, and at a vertical location beneath the windshield. Thus, the operator must look vertically downwardly, and to the right to see the information.

Moreover, many of these displays are associated with control buttons to change the state of the information displayed (i.e., radio volume, etc.). Again, if the operator's attention is diverted from the road to control these switches, the results may be undesirable.

It is therefore an object of this invention to provide an information display and associated control that does not remove the operator's line of vision from the road.

SUMMARY OF THE INVENTION

In a disclosed embodiment of this invention, a display panel is positioned on a rear surface of a sunvisor. The sunvisor is of the type which is pivoted downwardly into the driver's view, at a location adjacent the vertically upper end of the windshield. In this way, when the operator wishes to view information on the sunvisor, the sunvisor may be simply pivoted to the down position, and the information is directly in the line of sight of the operator. The operator may only need to look up slightly, and need not look to the side to gain access to the information.

The present invention provides information to the operator directly vertically above the operator's line of sight to the traffic. Thus, the operator need only look slightly vertically upwardly. The panel is preferably incorporated into the visor. The information is of the type a driver may reference while driving forwardly, as opposed to backing up.

In other preferred embodiments of this invention, control buttons to control the information displayed on the display panel are also provided adjacent to the display panel. These controls can also be provided by touch screen menu areas. As an example, the display buttons may be controls to adjust the level of volume for a radio, should the radio be the information displayed on the rear of the sunvisor. The controls necessary for achieving selective control of the information displayed are known. It is the inclusion of the display panel and the controls on the rear of the sunvisor which is the inventive feature of this application.

These and other features of this invention may be understood from the following specification and drawings, the following of which is a brief description.

DETAILED DESCRIPTION OF A PREFERRED EMBODIMENT

Figure 1:
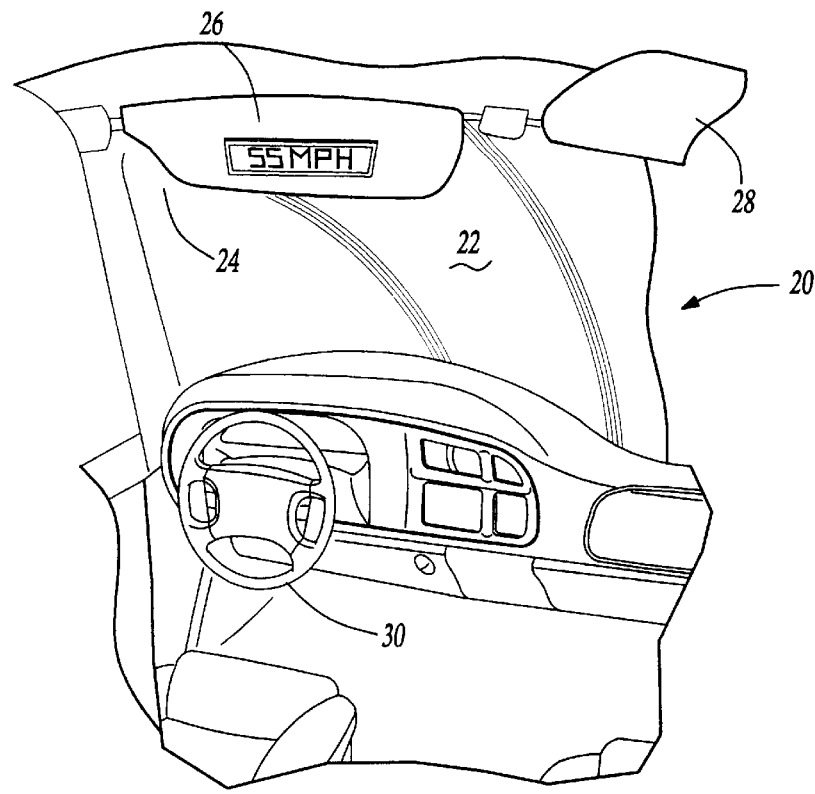
FIG. 1 is a schematic view of a vehicle windshield.

A vehicle cab 20 is shown in FIG. 1 incorporating a window glass 22 which shows the road line of sight to the operator. A sunvisor 24 is shown pivoted to a downward position, and a display panel 26 is shown in FIG. 1 on the rear of the sunvisor 24. The display panel 26 is shown displaying speed information, such as typically displayed in the instrument panel. The front of the sunvisor faces outwardly of the vehicle and blocks sunshine into the vehicle.

The sunvisor 28 is pivoted to a stowed position, again as known. Visor 26 may also move to this stowed position.

The location of the steering wheel 30 gives a perspective of the location of the operator's line of sight. The sunvisor display panel 26 is in a location such that the operator need only avert his eyes slightly vertically upwardly to gain access to information displayed on panel 26.

The information displayed is of the sort which a driver will need to access while driving forwardly. This is contrasted to information only valuable while backing up, such as collision avoidance information. While backing up information displayed on the sun visor does not assist the operator in not looking away from the driving direction.

Figure 2:
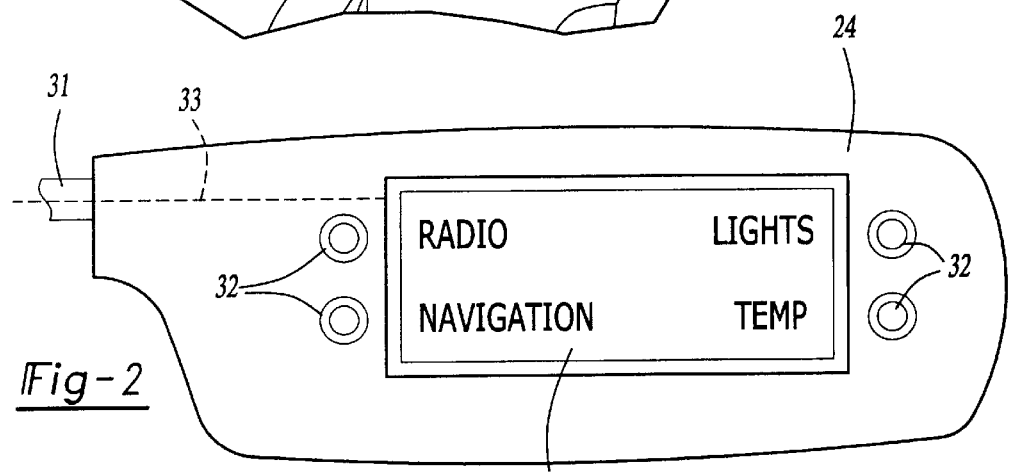
FIG. 2 is an enlarged view of a sunvisor incorporated into the FIG. 1 vehicle windshield.

As shown in FIG. 2, the sunvisor 24 incorporates the panel 26. A pivot post 31, which is well known in the art, passes electrical signals to and from the sunvisor. Wires 33 are shown schematically for transmitting this information to and from the display 26 and controls on the vehicle. Typically, the sunvisors have been provided with illuminated lights, but no display panel. Thus, the provision of electrical signals to and from the sunvisor is known. It is the use of the display panel with the signals passing through the pivot post which is unique in this invention. While control buttons 32 are shown, it should be understood that touch screen controls can be used. The display panel is preferably of the reconfigurable type such as LED, LCD, ELD, etc.

Figure 3:
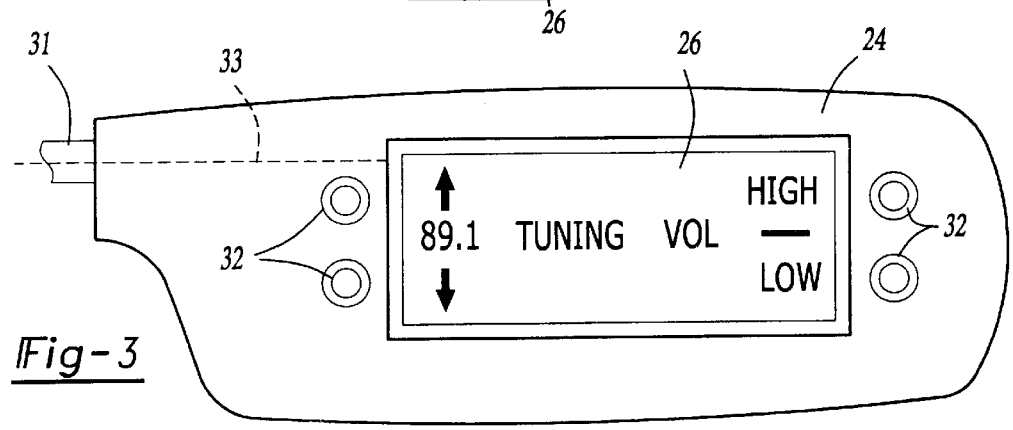
FIG. 3 is a view similar to FIG. 2, but showing a subsequent display.

Controls, such as buttons 32 allow an operator to select what type of information is displayed, and also adjust variables. As an example, the operator may select from interior comfort options such as radio, lighting temperature, or navigation information. If the driver actuates the radio button as shown in FIG. 2, then the display moves to a radio control display, such as shown in FIG. 3. The operator can manipulate the buttons to select radio information to be displayed. The operator will then be able to adjust aspects of the radio such as volume or tuning. Thus, the operator is able to adjust the radio without diverting his attention from the road other than to look slightly vertically upwardly to the display panel 26. The controls to achieve this adjustment are known, it is the provision of such features into the sunvisor which is inventive. Further, the displays illustrated in the Figures are simplified to allow early understanding of the basic concepts.

The present invention provides an additional area for display which is easily accessible to the operator, without diverting attention from the road. The present invention thus is a great improvement upon the prior art. A worker of ordinary skill in the art would recognize that certain modifications come within the scope of this invention. For that reason, the following claims should be studied to determine the true scope and content of this invention.

What is claimed is:

1. A vehicle cab comprising a front windshield, and at least one sunvisor, said sunvisor having a mount structure to be mounted to a roof of said vehicle, said sunvisor being pivotable between a stowed position wherein a first surface faces into said cab, and a second surface faces said ceiling, and said sunvisor being movable to a extended position wherein said second surface faces into said cab and said first surface faces outwardly through said windshield; and a display panel being connected to said second surface, said display panel being connected to a control on said vehicle to display information relative to the operation of at least one component of said vehicle.

2. A vehicle cab as recited in claim 1, wherein said sunvisor is attached to said vehicle by a pivot post, and control wires extending through said pivot post to said display panel.

3. A sunvisor as recited in claim 1, wherein control switches are provided adjacent to said display panel to allow an operator to control information which is displayed on said display panel.

4. A sunvisor as recited in claim 1, wherein said display panel is a reconfigurable display panel.

5. A sunvisor as recited in claim 1, wherein signals wires extending to said display panel pass through a pivot post for said sunvisor.

6. A sunvisor as recited in claim 1, wherein said display panel displays information which a driver will access while driving forwardly.

* * * * *